(12) United States Patent
Hara et al.

(10) Patent No.: US 12,169,411 B2
(45) Date of Patent: Dec. 17, 2024

(54) INFORMATION PROCESSING DEVICE FOR CONSTRUCTING AN OCCUPIED MAP FOR A MOBILE ROBOT

(71) Applicant: Chiba institute of technology, Chiba (JP)

(72) Inventors: Yoshitaka Hara, Chiba (JP); Masahiro Tomono, Chiba (JP)

(73) Assignee: CHIBA INSTITUTE OF TECHNOLOGY, Chiba (JP)

( * ) Notice: Subject to any disclaimer, the term of this patent is extended or adjusted under 35 U.S.C. 154(b) by 370 days.

(21) Appl. No.: 17/434,150

(22) PCT Filed: Mar. 13, 2019

(86) PCT No.: PCT/JP2019/010327
§ 371 (c)(1),
(2) Date: Aug. 26, 2021

(87) PCT Pub. No.: WO2020/183658
PCT Pub. Date: Sep. 17, 2020

(65) Prior Publication Data
US 2022/0100201 A1    Mar. 31, 2022

(51) Int. Cl.
*G05D 1/00* (2024.01)
*G01S 17/89* (2020.01)
*G01S 17/931* (2020.01)

(52) U.S. Cl.
CPC ............ *G05D 1/0274* (2013.01); *G01S 17/89* (2013.01); *G01S 17/931* (2020.01); *G05D 1/024* (2013.01)

(58) Field of Classification Search
None
See application file for complete search history.

(56) References Cited

U.S. PATENT DOCUMENTS

2015/0185025 A1    7/2015   Lacaze et al.

FOREIGN PATENT DOCUMENTS

| JP | 2005-332204 A | 12/2005 |
| JP | 2009-223757 A | 10/2009 |

(Continued)

OTHER PUBLICATIONS

Jiang, Jun & Miyagusuku, Renato & Yamashita, Atsushi & Asama, Hajime. (2017). Glass confidence maps building based on neural networks using laser range-finders for mobile robots. 405-410. 10.1109/SII.2017.8279246. (Year: 2017).*

(Continued)

*Primary Examiner* — Jonathan M Dager
*Assistant Examiner* — Charles Pall
(74) *Attorney, Agent, or Firm* — Pearne & Gordon LLP (57) ABSTRACT

An information processing device includes a detection section configured to acquire the presence or absence of an object at the periphery of a mobile robot as the detection information, a control section configured to control the detection section, and a map construction section configured to construct an occupied map. The map construction section includes a storage configured to store the detection information in chronological order, a map producer configured to produce a map based on the detection information, a normal line acquirer configured to acquire a normal line to each determination point based on the presence or absence of the object at the periphery of each determination point on the temporal map produced by the map producer, and a validity determinator configured to determine the validity of the detection information on each determination point based on an angle between each beam and the normal line at each determination point.

6 Claims, 9 Drawing Sheets

(56) References Cited

FOREIGN PATENT DOCUMENTS

| JP | 2009-252162 A | 10/2009 |
|---|---|---|
| JP | 2016-091202 A | 5/2016 |
| JP | 2017-157087 A | 9/2017 |
| JP | 2018-005709 A | 1/2018 |

OTHER PUBLICATIONS

J. Sock, J. Kim, J. Min and K. Kwak, "Probabilistic traversability map generation using 3D-LIDAR and camera," 2016 IEEE International Conference on Robotics and Automation (ICRA), Stockholm, Sweden, 2016, pp. 5631-5637, doi: 10.1109/ICRA.2016.7487782. (Year: 2016).*

S. Wielandt, A. Van Nieuwenhuyse, et.al. "Evaluation of angle of arrival estimation for localization in multiple indoor environments," 2014 Ubiquitous Positioning Indoor Navigation and Location Based Service (UPINLBS), Corpus Christi, TX, USA, 2014, pp. 36-43, doi: 10.11 (Year: 2014).*

Y. Arai and M. Sekiai, "Absolute position measurement system for mobile robot based on incident angle detection of infrared light," Proceedings 2003 IEEE/RSJ International Conference on Intelligent Robots (Cat. No. 03CH37453), Las Vegas, NV, USA, 2003, pp. 986-991 vol. 1, doi: 10.1109/IROS.20 (Year: 2003).*

International Search Report dated Apr. 23, 2019 issued in Patent Application No. PCT/2019/010327.

Jiang Jun et al: "Glass confidence maps building based on neural networks using laser range-finders for mobile robots", 2017 IEEE/SICE International Symposium on System Integration (SII), IEEE, Dec. 11, 2017 (Dec. 11, 2017), pp. 405-410, XP033312836, DOI: 10.1109/SII. 2017.8279246 [retrieved on Feb. 1, 2018].

Foster Paul et al: "VisAGGE: Visible angle for glass environments", 2013 IEEE International Conference on Robotics and Automation (ICRA); May 6-10, 2013; Karlsruhe, Germany, IEEE, US, May 6, 2013 (May 6, 2013), pp. 2213-2220, XP032506650, ISSN: 1050-4729, DOI: 10.1109/ICRA.2013.6630875 ISBN: 978-1-4673-5641-1 [retrieved on Oct. 13, 2013].

European Search Report issued on Sep. 26, 2022 for the corresponding European Patent Application No. 19919239.4.

* cited by examiner

INFORMATION PROCESSING DEVICE FOR CONSTRUCTING AN OCCUPIED MAP FOR A MOBILE ROBOT

TECHNICAL FIELD

The present invention relates to an information processing device and a mobile robot.

BACKGROUND ART

Typically, a technique called simultaneous localization and mapping (SLAM) and employed for self-position estimation and environmental map production has been used as the technique of causing an autonomously-travelable mobile body to autonomously travel. As an environmental map, an occupied grid map or a point cloud map produced based on the presence or absence of an object in a movement area of the mobile body is used in some cases (see, e.g., Patent Literatures 1 and 2). In the occupied grid map, a plane or a space in the movement area is divided into multiple sections (cells) and is stored, and a cell value corresponding to the presence or absence of the object is assigned to each divided section. The point cloud map represents, as a point (coordinates) discretized into each minute region, the object present in the plane or the space in the movement area, and as the map, utilizes point cloud data which is the group of these points.

CITATION LIST

Patent Literature

PATENT LITERATURE 1: JP-A-2017-157087
PATENT LITERATURE 2: JP-A-2018-005709

SUMMARY OF THE INVENTION

Problems to be Solved by the Invention

The occupied grid map or the point cloud map is produced based on detection information acquired in such a manner that the object in the space is detected using a laser scanner (light detection and ranging (LIDAR)). In this case, the laser scanner acquires the presence or absence of the object as the detection information according to return of a laser beam emitted from the laser scanner and reflected on an object surface or a road surface. An occupation probability is obtained for each determination point (each cell or point) on the beam by ray casting processing. However, in a case where the emission angle of the beam with respect to the object surface or the road surface is shallow, it might be sensed such that the beam passed through such a surface. This leads to a problem that the object is eliminated from the map due to erroneous determination as the object being absent.

An object of the present invention is to provide an information processing device and a mobile robot capable of reducing erroneous determination about an object and improving a map accuracy.

Solutions to the Problems

The information processing device of the present invention is an information processing device for processing detection information obtained by detection of an object at the periphery of a mobile body to construct an occupied map as a map indicating an occupation probability at the periphery of a movement path of the mobile body. The information processing device includes a detection section configured to acquire, by emitting beams to the periphery of the mobile body, the presence or absence of the object as the detection information on each beam, a control section configured to control the detection section, and a map construction section configured to construct the occupied map. The map construction section includes a storage configured to store, in chronological order, the detection information acquired by the detection section, a map producer configured to produce a map of the periphery of the mobile body based on the detection information stored in the storage, a normal line acquirer configured to acquire, by setting multiple determination points on each beam in the detection information, a normal line to each determination point based on the presence or absence of the object at the periphery of each determination point on the temporal map produced by the map producer, and a validity determinator configured to determine the validity of the detection information on each determination point based on an incident angle as an angle between each beam and the normal line at each determination point. The map producer constructs the occupied map by means of the detection information on which the validity of each determination point is reflected.

According to such an aspect of the present invention, the information processing device acquires the normal line to each determination point on the beam by the normal line acquirer, determines the validity of the detection information on each determination point based on the incident angle as the angle between the beam and the normal line by the validity determinator, and constructs the occupied map by means of the detection information on which the validity of each determination point is reflected by the map producer. Thus, the detection information erroneously determined as the absent of the object due to emission of the beam to the object surface with a shallow angle and having a low validity can be eliminated. The occupied map is constructed based on the highly-valid detection information obtained by accurate sensing of the object, and therefore, the map accuracy can be improved.

In the present invention, the map construction section preferably executes the first processing step of causing, after movement of the mobile body for a predetermined time and acquisition of the detection information by the detection section, the map producer to produce the temporal map based on the detection information at all time points stored in the storage, and the second processing step of causing the normal line acquirer to acquire the normal line to each determination point by means of the presence or absence of the object at the periphery of each determination point on the temporal map, causing the validity determinator to determine the validity of the detection information on each determination point based on the incident angle at each determination point, and causing the map producer to construct the occupied map by means of the detection information on which the validity of each determination point is reflected.

According to such a configuration, the map construction section of the information processing device causes the map producer to produce the temporal map based on the detection information obtained at all time points at the first processing step. Thereafter, at the second processing step, the map construction section causes the normal line acquirer to acquire the normal line to each determination point by means of the presence or absence of the object at the periphery of each determination point on the temporal map, causes the validity determinator to determine the validity of the detection information on each determination point, and causes the map producer to produce the occupied map by means of the detection information on which the validity of each determination point is reflected. Thus, the map accuracy can be further improved. That is, the normal line acquirer acquires the normal line to each determination point by means of the temporal map based on the detection information obtained at all time points, and therefore, the normal line to each determination point can be obtained in a more accurate manner according to the data accumulated at all time points. The normal line acquirer can acquire the normal line by means of the detection information obtained at all time points even for the determination point for which the normal line cannot be obtained according to the detection information obtained in real time, and the validity determinator can determine the validity by means of the obtained normal line. Further, it may only be required that the validity determinator processes only the determination points identified as the normal lines being present based on the detection information obtained at all time points, and therefore, the map can be constructed in an efficient manner at a lower calculation cost.

In the present invention, the validity determinator preferably sets, as a weight indicating the validity of the detection information on each determination point, a smaller weight for a greater incident angle and a greater weight for a smaller incident angle based on the incident angle at each determination point, and the map producer preferably constructs the occupied map by means of the detection information on which the weight set for each determination point by the validity determinator is reflected.

According to such a configuration, the validity determinator sets a smaller weight for a greater incident angle and a greater weight for a smaller incident angle based on the incident angle of the beam at each determination point, and therefore, the validity of the detection information on the determination point can be evaluated in a stepwise manner. The map producer constructs the occupied map by means of the detection information on which the weight on each determination point is reflected, and therefore, the map accuracy can be improved while erroneous object determination is reduced.

In the present invention, the map producer preferably constructs the occupied map without using the detection information on a determination point determined as invalid by the validity determinator.

According to such a configuration, the map producer can exclude the influence of the detection information on the determination point determined as invalid by the validity determinator due to emission of the beam with a shallow angle, and can construct the map in an efficient manner at a lower calculation cost.

In the present invention, the map producer preferably constructs the occupied map by means of the detection information on each determination point on a close side with respect to an invalid determination point determined as invalid by the validity determinator without using the detection information on all determination points on a far side with respect to the invalid determination point among determination points set on each beam to which the invalid determination point belongs.

According to such a configuration, the map producer does not use the detection information on all determination points on the far side with respect to the invalid determination point determined as invalid by the validity determinator, so that the amount of data to be used can be reduced and the map can be constructed in a far more efficient manner.

The mobile robot of the present invention includes the above-described information processing device and a mobile section configured to move the mobile body.

According to such an aspect of the present invention, the mobile robot includes the information processing device and the mobile section, and constructs the map by the map construction section. Thus, as described above, the occupied map of the periphery of the movement path can be also constructed with a favorable efficiency.

DESCRIPTION OF THE EMBODIMENTS

Hereinafter, one embodiment of the present invention will be described based on FIGS. 1 to 9.

Figure 1:
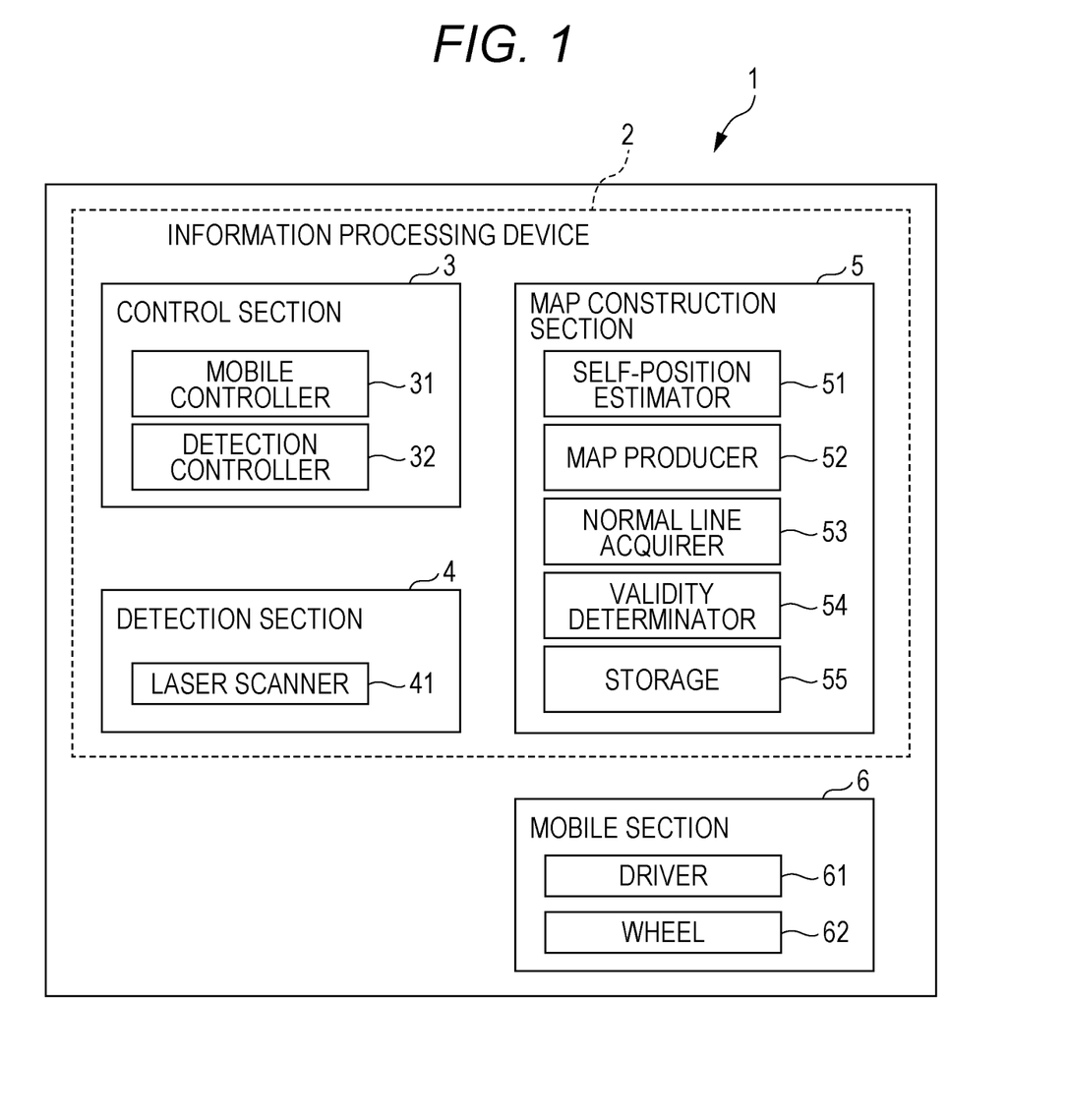
FIG. 1 is a block diagram showing an outline configuration of a mobile robot according to one embodiment of the present invention.

FIG. 1 is a block diagram showing an outline configuration of a mobile robot 1 according to one embodiment of the present invention.

The mobile robot 1 as a mobile body of the present embodiment includes, as shown in FIG. 1, a control section 3, a detection section 4, a map construction section 5, and a mobile section 6. The control section 3, the detection section 4, and the map construction section 5 form an information processing device 2. The detection section 4 has a laser scanner 41 configured to emit beams B to the periphery of the mobile robot 1 and to detect the presence or absence of an object, and acquires detection information on each emitted beam B. The mobile section 6 has a driver 61 such as a motor and a wheel 62 to be rotatably driven by the driver 61, and causes the mobile robot 1 to autonomously travel.

The control section 3 includes an arithmetic section such as a CPU and a storage section such as a ROM or a RAM to control operation of the mobile robot 1, and includes a mobile controller 31 configured to control the mobile section 6 and a detection controller 32 configured to control the detection section 4. The map construction section 5 includes a self-position estimator 51 configured to estimate the self-position of the mobile robot 1 by a SLAM technique, a map producer 52 configured to produce the map of the periphery of the mobile robot 1 as described later, a normal line acquirer 53, a validity determinator 54, and a storage 55 configured to store the detection information acquired by the detection section 4, the map produced by the map producer 52, various types of data, etc. As the map produced by the map producer 52, an optional map such as an occupied grid map or a point cloud map can be utilized. Hereinafter, the case of producing the occupied grid map will be described.

For example, as the laser scanner 41 of the detection section 4, light detection and ranging (LIDAR) for circumferentially emitting laser light such as infrared laser to measure a distance to the object is suitable. The laser scanner 41 takes sensor center and orientation as the self-position acquired by the SLAM technique as a reference position, and detects the presence or absence and position of the object based on a distance from the sensor center, an angle (direction) about the sensor center, and a height (the angle of elevation or the angle of depression) from the sensor center. In such object detection (hereinafter sometimes merely referred to as a scan), a detection value for a single cycle (e.g., a single rotation,) 360° of the laser scanner 41 is taken as a single unit (a single scan) based on the beams B emitted with a predetermined resolution (e.g., 1°) in detection for the single cycle, and as the detection information, is stored in chronological order in the storage 55.

Figure 2:
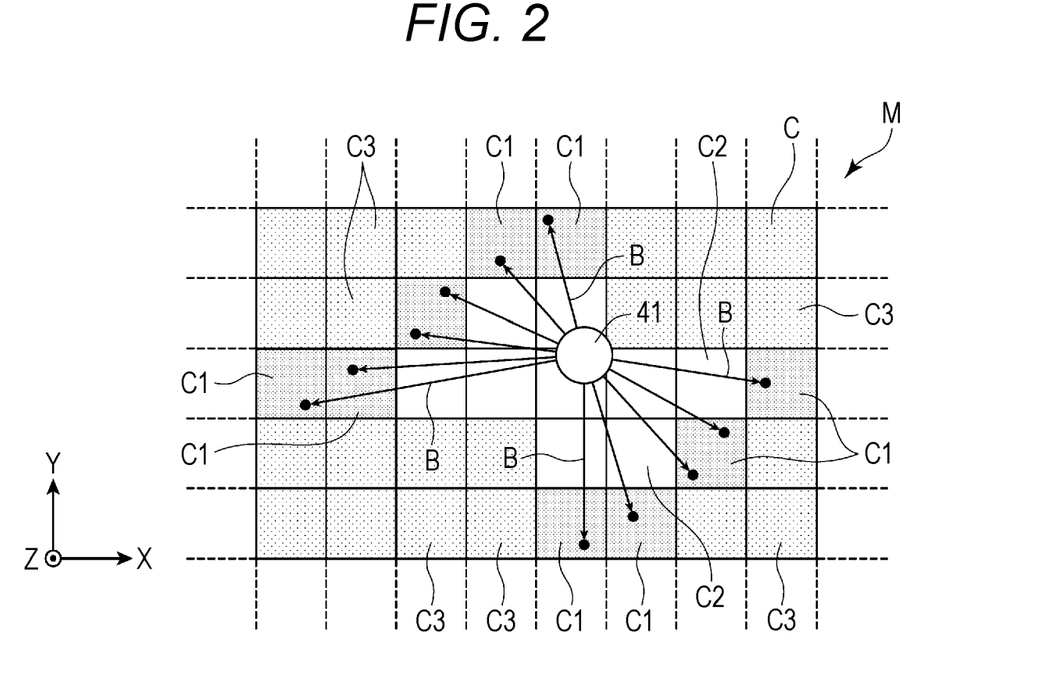
FIG. 2 is a plan view of an occupied grid map for describing object detection operation by the mobile robot.
Figure 3:
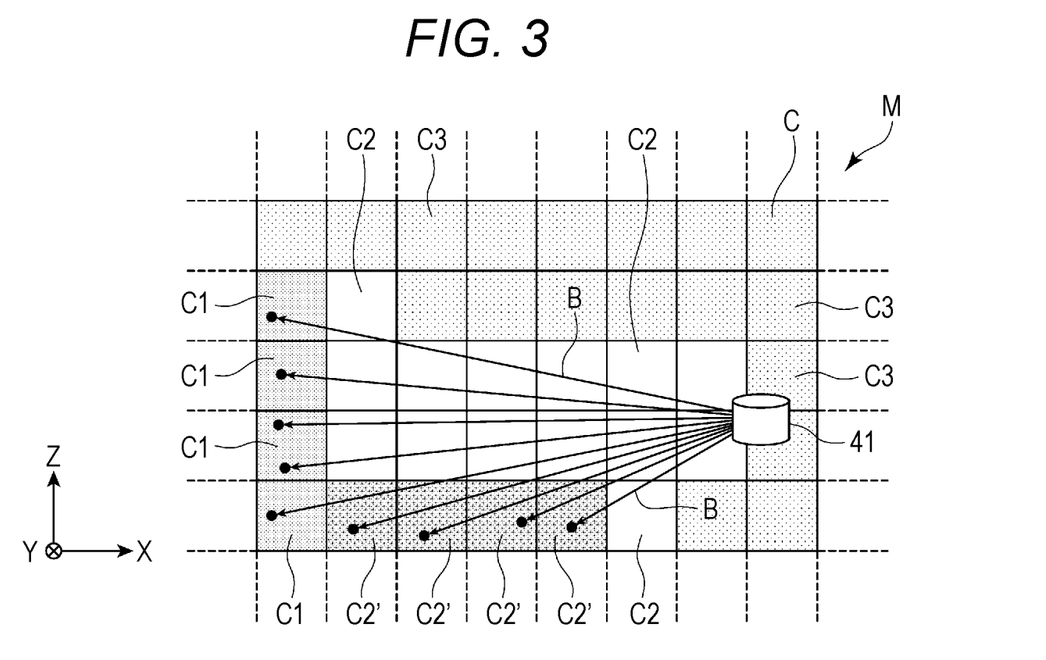
FIG. 3 is a side view of the occupied grid map for describing the object detection operation by the mobile robot.

Next, a basic concept according to production of the occupied grid map will be described with reference to FIGS. 2 and 3. FIGS. 2 and 3 are a plan view and a side view of the occupied grid map for describing object detection operation by the mobile robot 1. The occupied grid map M defines a target space as a three-dimensional space, divides such a space into cells C with a predetermined size (e.g., 10 cubic centimeters), and sets a cell value for each cell C. For example, ray casting is standard as the method for producing the occupied grid map M. Hereinafter, the steps of producing the occupied grid map M by means of ray casting will be described.

The cell value of the occupied grid map M is managed using an occupation probability and logarithmic odds. In ray casting, a line representing the beam B extends from the sensor center, and the value of a cell C through which the beam B passed is updated. A cell C at such a position that the beam B from the laser scanner 41 contacted the object is an occupied cell C1 (e.g., Logarithmic Odds=1), a cell C through which the beam B passed is a free cell C2 (e.g., Logarithmic Odds=−1), and an unobserved cell C outside a measurement range is an unknown cell C3 (e.g., Logarithmic Odds=0). As the cell values of the occupied grid map M, cell values obtained by multiple scans are added up to calculate the logarithmic odds. For example, when a certain cell C is taken as occupied three times and is taken as free twice, the logarithmic odds is 3+(−2)=1. The occupation probability of each cell C, i.e., whether the object is present (occupied), absent (free), or unknown in such a cell C, is calculated as a probability value from the logarithmic odds accumulated by repeated scans, and the occupied grid map M is produced using these values.

Figure 4:
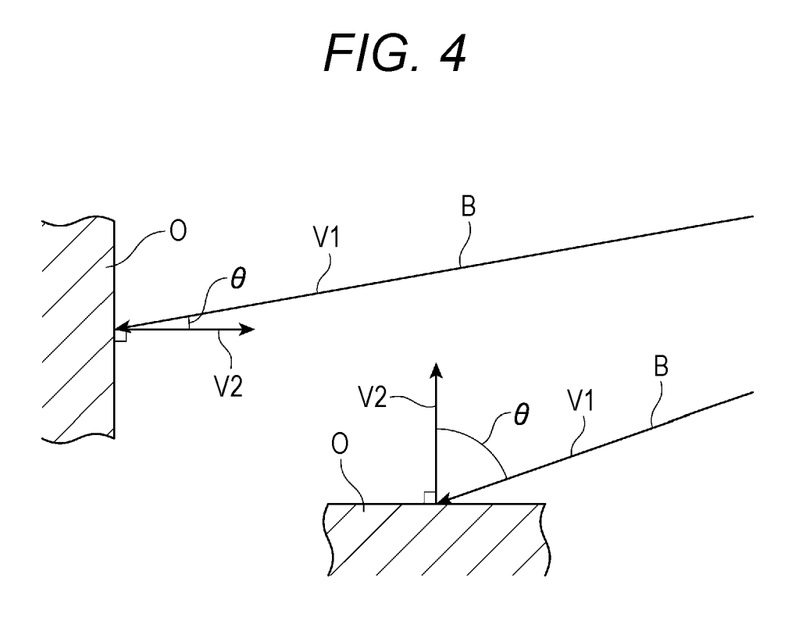
FIG. 4 is a view showing an emission state of a beam in the detection operation of the mobile robot.

For obtaining the cell value of each cell C, passage of the beam B from the laser scanner 41 or contact of the beam B with the object needs to be accurately sensed. FIG. 4 is a view showing an emission state of the beam B in the detection operation of the mobile robot 1. As shown in FIG. 4, when the emitted beam B contacts the object O, the direction vector V1 of the beam B and the direction vector V2 of a normal line perpendicular to a surface of the object O cross each other with various angles. An angle θ (hereinafter sometimes referred to as an incident angle θ) between the direction vector V1 of the beam B and the direction vector V2 of the normal line might provide influence on the cell value of the occupied grid map M.

As shown in the side view of FIG. 3, the incident angle θ of the beam B is smaller with respect to a wall surface in the front of the laser scanner 41, and is greater with respect to a road surface below the laser scanner 41. The occupied grid map M expresses the space or the object with the space or the object being discretized into the divided cells C, and therefore, in the case of a great incident angle θ with respect to the object surface, the occupied cell C1 determined as the beam B having contacted the object is determined as another beam B passed through such an occupied cell C1 although the object is present. Due to a determination error caused by discretization as described above, the cell C for the road surface that the beam B enters with a shallow angle is supposed to be determined as the occupied cell C1, but in some cases, is determined as the free cell C2 because of accumulation of information indicating that the beam B passed through the cell C. The cell C erroneously determined as the free cell C2 even though the object is present as described above will be hereinafter referred to as an erroneously-determined cell C2'. When the beam B contacts the surface of the object O with a small incident angle θ, i.e., a deep angle, the beam B reflected on the surface of the object O is more likely to be received, and a relatively-high sensing accuracy is obtained. On the other hand, when the beam B contacts the surface of the object O with a great incident angle θ, i.e., a shallow angle, the sensing accuracy is degraded in some cases.

Figure 5:
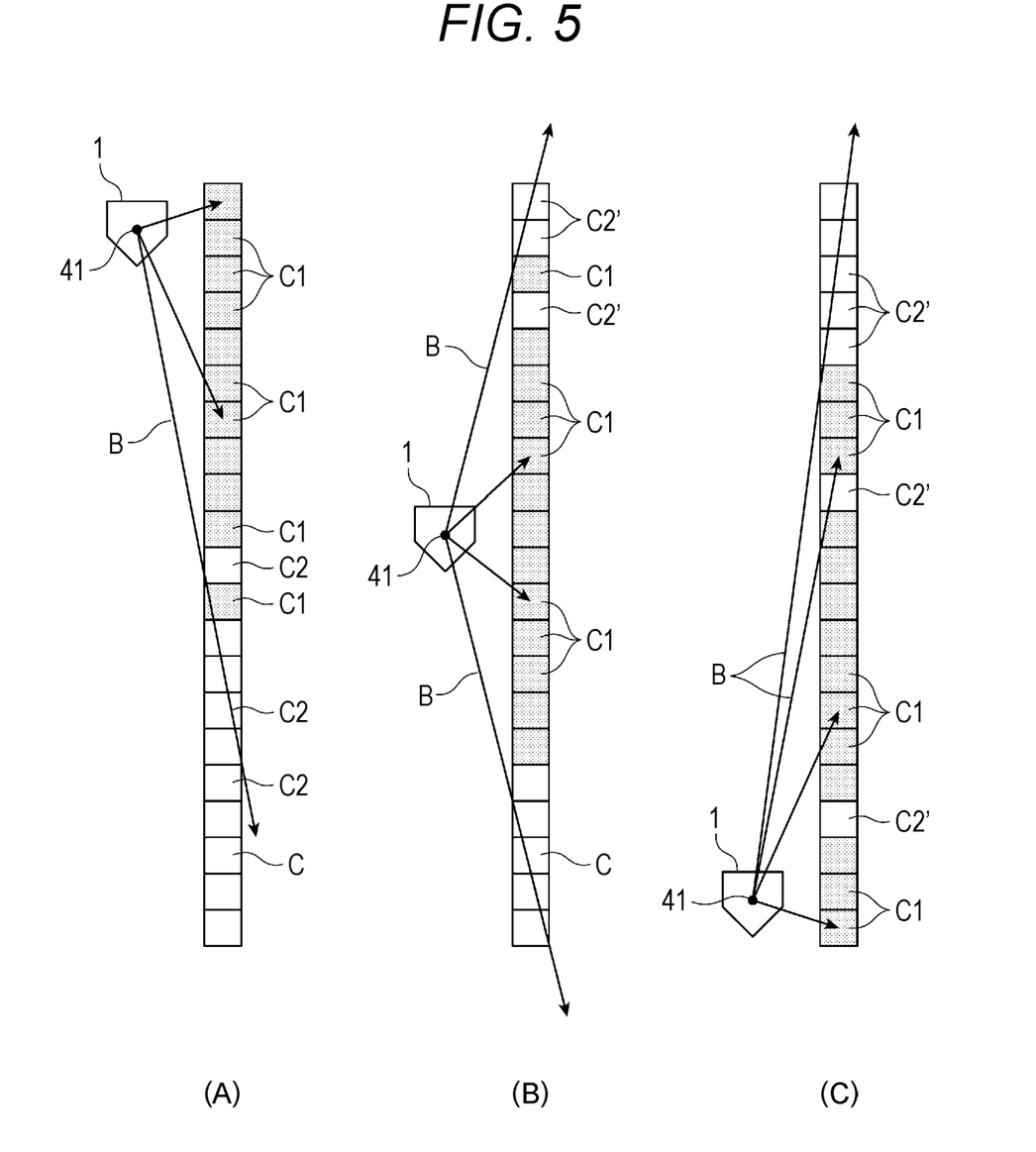
FIG. 5 shows plan views for describing a problem in the detection operation by the mobile robot.

FIG. 5 shows plan views for describing a problem in the detection operation by the mobile robot. In FIGS. 5(A) to 5(C), the mobile robot 1 scans a wall surface present on the left side (the right side in the figure) of the mobile robot 1 itself by the laser scanner 41 while moving downwardly in the figure, and sets cell values of cells C corresponding to a wall as the object. As shown in FIG. 5(A), in the initial phase of scanning of the wall surface, the wall surface present close to the mobile robot 1 is sensed and determined as occupied cells C1 because of a small incident angle θ. Such detection information is stored in chronological order in the storage 55. On the other hand, the wall surface present far (the lower side in the figure) from the mobile robot 1 is, because of a great incident angle θ, erroneously determined as free cells C2, or is not sensed and is determined as unknown cells C3. Such detection information is stored in chronological order in the storage 55.

Next, as shown in FIG. 5(B), in an intermediate phase in which the mobile robot 1 moved to an intermediate portion of the wall, the incident angle θ with respect to the wall surface present close to the mobile robot 1 decreases. Thus, the cells C initially determined as the free cells C2 or the unknown cells C3 can be accurately sensed, and the detection information in the storage 55 is updated with the occupied cells C1. On the other hand, although the wall surface on the upper side in FIG. 5(B) is initially determined as the occupied cells C1, the incident angle θ with respect to such a wall surface increases. For this reason, these cells are determined as the beams B having passed through the cells, and the detection information is updated with erroneously-determined cells C2'. That is, the value indicating the beam B with a great incident angle θ is accumulated for the cell C previously accurately determined as the occupied cell C1, and for this reason, the detection information is updated with erroneous determination as the erroneously-determined cell C2' being caused.

Further, as shown in FIG. 5(C), in a latter phase in which the mobile robot 1 moved to the other end side of the wall, the incident angle θ with respect to the wall surface present close to the mobile robot 1 decreases, and therefore, the cells C determined as the free cells C2 or the unknown cells C3 in the initial phase and the intermediate phase can be accurately sensed. Many of these cells C are determined as occupied cells C1, and the detection information in the storage 55 is updated accordingly. However, the cell values as the free cells C2 are accumulated in the previous scan, and for this reason, the cell C remaining as the erroneously-determined cell C2' without being updated as the occupied cell C1 still remains. That is, a previous scan result influences a future scan, and a situation where information indicating the erroneously-determined cell C2' remains and the detection information cannot be accurately updated is caused. The incident angle θ with respect to each cell C on the upper side in FIG. 5(C) further increases, and for this reason, an area including the cells C rewritten to the erroneously-determined cells C2' is expanded.

In the present embodiment, for reducing the influence of the detection information including the erroneously-determined cells C2' on production of the occupied grid map M, multiple determination points are set on each beam B in the detection information on such a beam B, the normal line to each determination point is acquired by the normal line acquirer 53 of the control section 3, and the validity determinator 54 determines the validity of the detection information on each determination point based on the incident angle θ between the beam B and the normal line at each determination point. The concept of the determination point on the beam B as described above will be described with reference to FIG. 6.

Figure 6:
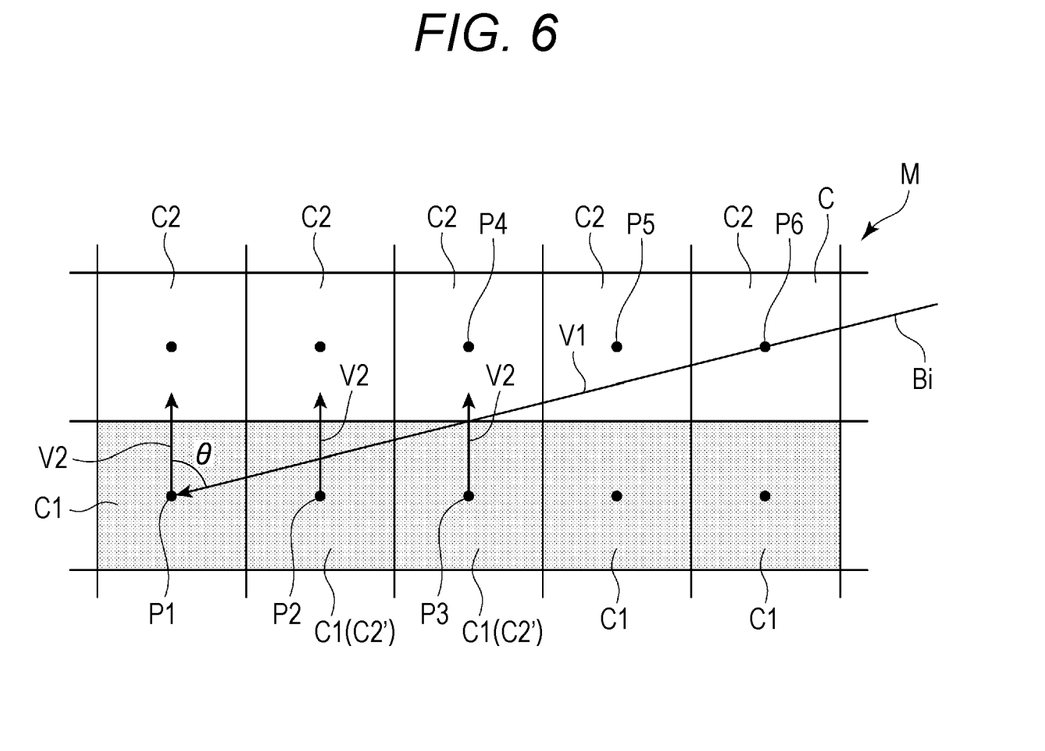
FIG. 6 is a view showing determination points on a beam for detection information acquired by a detection section.

FIG. 6 is a view showing the determination points on the beam B for the detection information acquired by the detection section. In the occupied grid map M shown in FIG. 6, a certain single beam Bi passes through multiple cells C, and a cell C in which a tip end of the beam Bi contacted an object is sensed as an occupied cell C1. The center coordinates of the occupied cell C1 are set to a determination point P1. Then, determination points P2, P3, P4, . . . are sequentially set for other cells C through which the beam Bi passed. The cells C for which the determination points P2, P3 being set are determined as occupied cells C1 in the occupied grid map M, but might be determined as free cells C2, i.e., erroneously-determined cells C2', because the beam Bi passed through these cells C. Moreover, the cells C for which the determination points P4, P5, P6 being set are free cells C2 in the occupied grid map M, and are sensed as free cells C2 because the beam Bi passed through these cells C.

For each of these determination points P1 to P6 . . . Pn on the beam Bi as described above, the normal line acquirer 53 acquires the direction vector V2 of the normal line. The normal line acquirer 53 refers to multiple cells C (e.g., 26 peripheries) at the periphery of a target determination point, thereby determining the presence or absence of the object based on the cell value of each cell C and acquiring the direction vector V2 of the normal line. Specifically, The group S of cells with great cell values among cells close to the determination point P is obtained, and the average of vectors perpendicular to a line (in the case of a two-dimensional map) or a plane (in the case of a three-dimensional map) including each point of the group S and the determination point P is taken as the vector V2. Alternatively, principal component analysis may be performed for the group S to obtain the vector V2. After the direction vector V2 of the normal line is acquired for each of the determination points P1 to P6 . . . Pn as described above, the validity determinator 54 determines the validity of the detection information on each determination point based on the incident angle θ between the direction vector V1 of the beam Bi and the direction vector V2 of the normal line. Note that if there is no object (no occupied cell C1) at the periphery of the target determination point, the normal line acquirer 53 does not calculate the direction vector V2 of the normal line to such a determination point.

The validity determinator 54 determines the validity of the detection information (the cell value) on each determination point by means of the absolute value (0 to 1) of the inner product (cos θ) of the unit direction vector V1 of the beam Bi and the unit direction vector V2 of the normal line, for example. As invalidity determination, a case where the absolute value of the inner product is less than 0.5 (θ>60°) can be set as necessary, for example. As a determination method, the following three methods can be applied. First, as the first determination method, if there is an invalid determination point on the beam Bi, a cell value of a cell C with such an invalid determination point is invalidated and is not added to the logarithmic odds, and only cell values of cells C with valid determination points are added to the logarithmic odds and the resultant logarithmic odds are used for map production.

As the second determination method, if the determination points P1 to P6 . . . Pn on the beam Bi includes an invalid determination point, cell values of cells C with all determination points on a far side with respect to such an invalid determination point are not used, and cell values of cells C with determination points on a close side with respect to the invalid determination point are used for map production. That is, in FIG. 6, in a case where the determination point P3 is invalid, the cell values of the cells C with the determination points P1 to P3 are not used, and the cell values of the cells C with the determination points P4 to P6 . . . Pn on the close side with respect to the invalid determination point are added to the logarithmic odds and the resultant logarithmic odds are used for map production.

As the third determination method, the absolute value of the inner product calculated for each of the determination points P1 to P6 . . . Pn on the beam Bi is used as a weight, and the cell value of the cell C with the determination point is multiplied by the weight. That is, if the inner product of the unit direction vector V1 of the beam Bi and the unit direction vector V2 of the normal line at a certain determination point is 0.5 (θ=60°), a free cell value of −1 indicating the absence of the object in such a cell C is multiplied by 0.5, a cell value of −0.5 obtained by multiplication by the weight is added to the logarithmic odds, and the resultant logarithmic odds are used for map production, for example. Note that the weight by which the cell value is multiplied is not limited to direct use of the absolute value of the inner product. The absolute value may be further multiplied by a suitable weight coefficient, or a lower limit (e.g., 0.1) may be set for the absolute value of the inner product and determination points below the lower limit may be invalidated.

When the validity determinator 54 determines the validity of the cell value for each determination point and updates the detection information in the storage 55 as described above, the map producer 52 produces, based on the updated detection information, the occupied grid map M (a map equivalent to a later-described occupied map M2) at the periphery of a movement path of the mobile robot 1.

Figure 7:
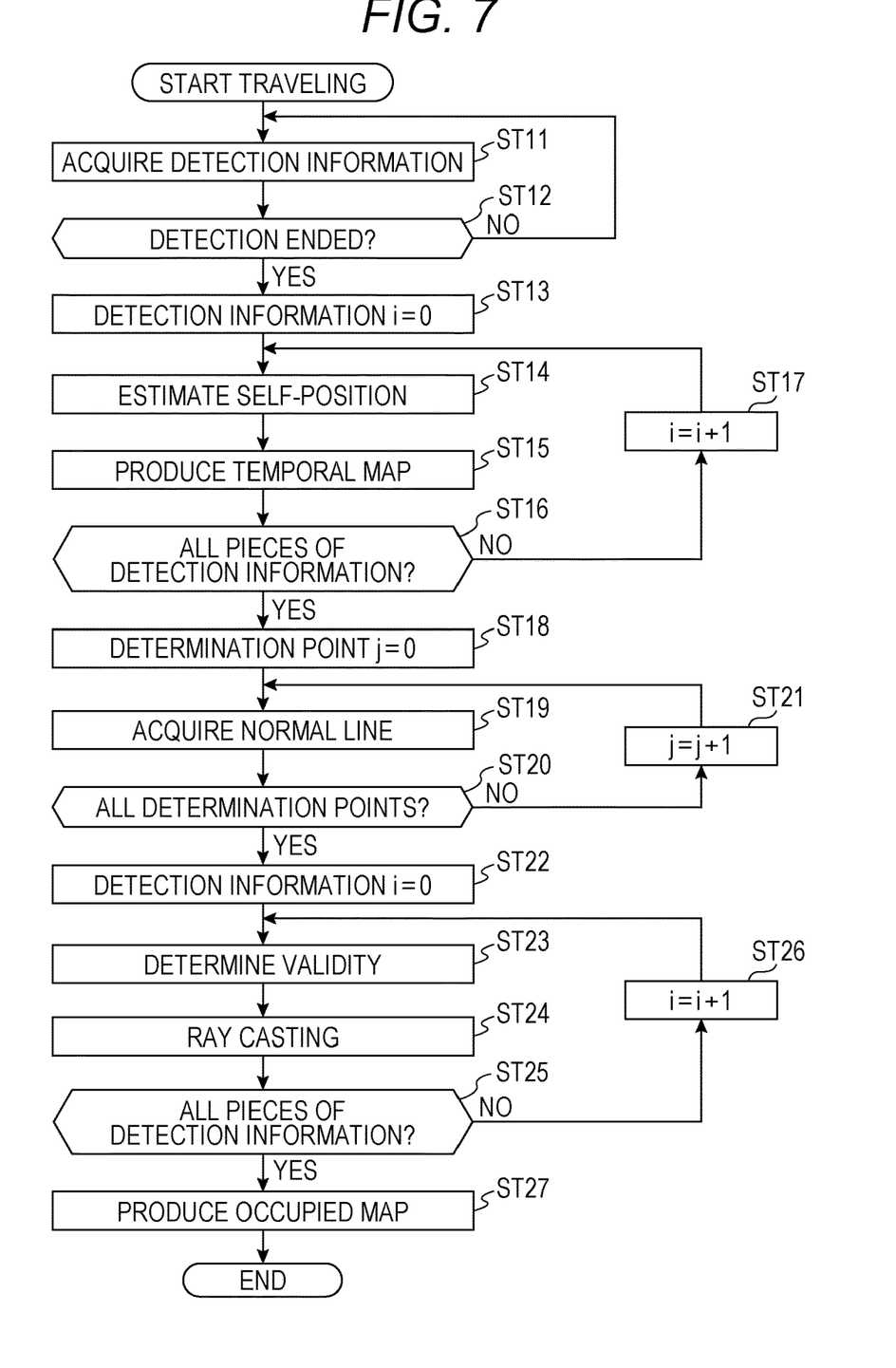
FIG. 7 is a flowchart showing operation of the mobile robot.
Figure 8:
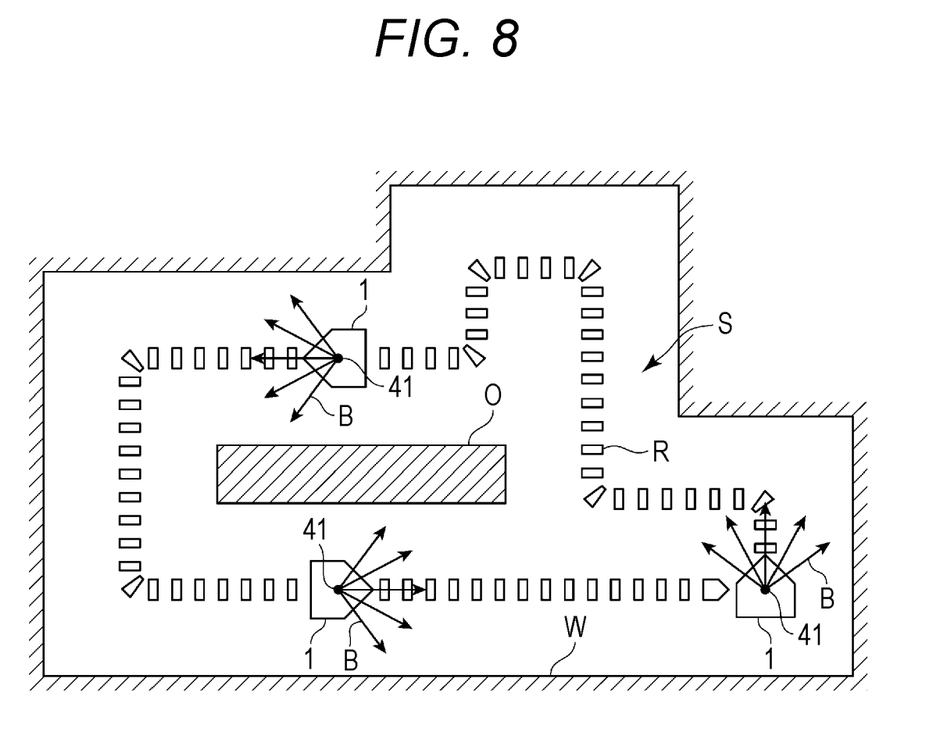
FIG. 8 is a plan view showing operation when the mobile robot produces the map.
Figure 9:
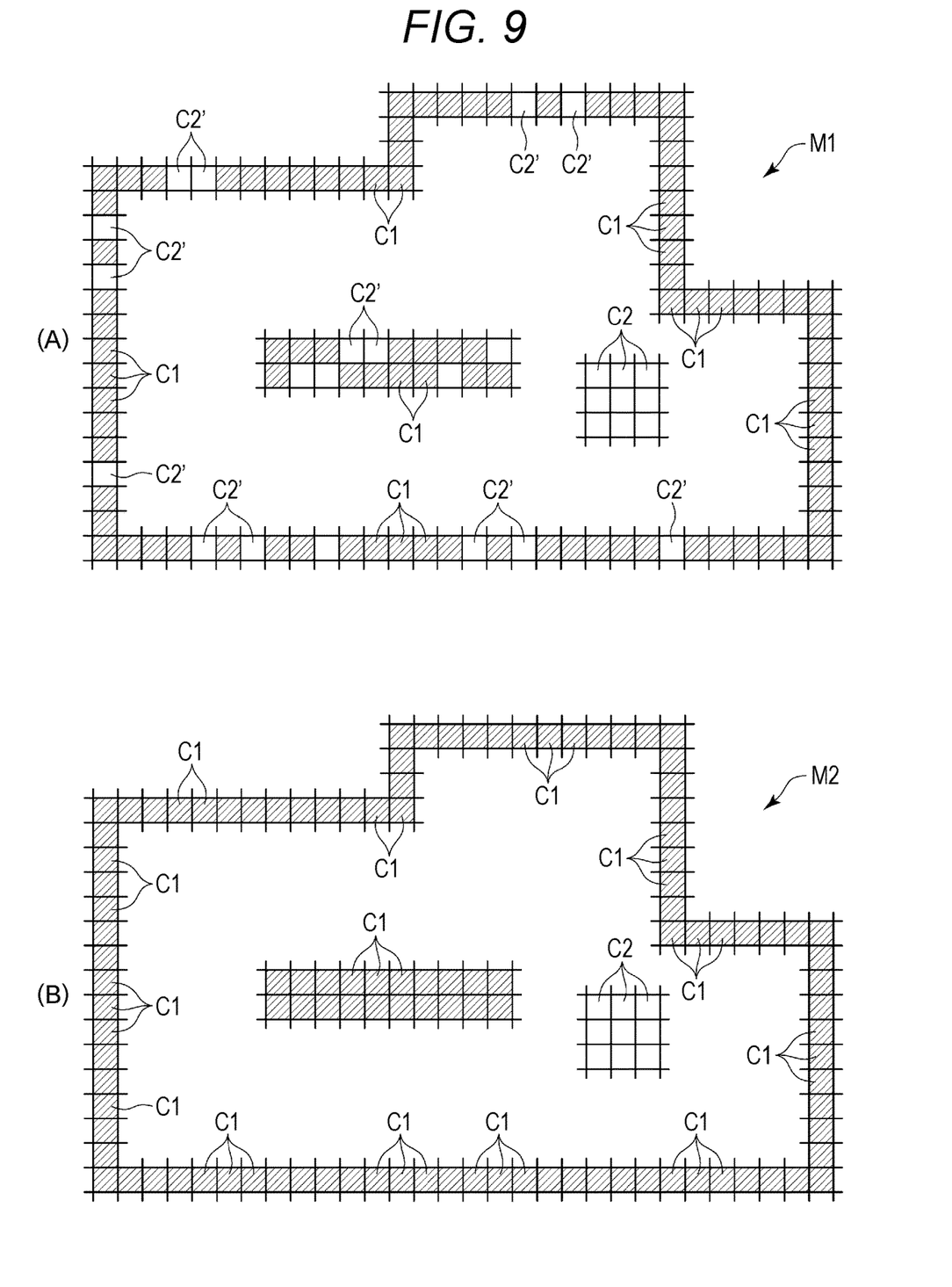
FIG. 9 shows views of a map produced by an information processing device of the mobile robot.

Hereinafter, the method for producing the occupied grid map M by the mobile robot 1 will be described in detail with reference to FIGS. 7 to 9. FIG. 7 is a flowchart showing operation of the mobile robot. FIG. 8 is a plan view showing operation when the mobile robot produces the map. FIG. 9 shows views of the map produced by the information processing device of the mobile robot, FIG. 9(A) showing an occupied grid map M1 produced by a typical technique and FIG. 9(B) showing the occupied map M2 produced by the technique of the present embodiment. Note that operation according to traveling of the mobile robot 1 will not be described herein and description will be made focusing on the steps of producing the occupied map M2 during traveling.

Traveling environment for the mobile robot 1 is inside a space S surrounded by a wall W in an example of FIG. 8, and the object O is placed in the space S. The mobile robot 1 starts from a starting point on the lower right side in FIG. 8, and travels counterclockwise along a movement path R. The mobile robot 1 moves in a circle in the space S, and returns to the starting point. As shown in the flowchart of FIG. 7, when the mobile robot 1 starts traveling by the mobile controller 31 of the control section 3, the laser scanner 41 of the detection section 4 is drivably controlled by the detection controller 32 of the control section 3 to start detection of the object at the periphery of the mobile robot 1 (a detection information acquisition step: a step ST11). The control section 3 stores, as the detection information, a detection value detected by the laser scanner 41 in the storage 55.

The control section 3 determines, for example, whether or not detection by the laser scanner 41 is to be ended based on whether or not the mobile robot 1 returned to the starting point (a step ST12). If the mobile robot 1 returned to the starting point, detection ends (YES at the step ST12), and the process proceeds to a next step ST13. If the mobile robot 1 does not return to the starting point yet, detection is continued (NO at the step ST12), and the detection information acquisition step (the step ST11) is repeated. In this manner, the detection information acquired by the laser scanner 41 is stored in chronological order in the storage 55. When the control section 3 ends the detection information acquisition step (the step ST11), the map construction section 5 resets the index of the detection information i to zero (i=0) (the step ST13).

Next, the map construction section 5 estimates the self-position by the self-position estimator 51 based on the detection information i at all time points stored in the storage 55 (a self-position estimation step: a step ST14), and causes the map producer 52 to produce a temporary map based on the detection information i obtained at all time points (a temporary map production step: a step ST15). The control section 3 determines whether or not arithmetic processing for all pieces of the detection information i ended (a step ST16). If the arithmetic processing for all pieces of the detection information i ended (YES at the step ST16), the map construction section 5 stores the produced temporal map in the storage 55, and then, the process proceeds to a next step ST18. If the arithmetic processing for all pieces of the detection information i does not end yet (NO at the step ST16), the self-position estimation step (the step ST14) and the temporal map production step (the step ST15) are repeated at the step ST17 for a next piece of the detection information i (i=i+1).

At the temporary map production step (the step ST15), ray casting is not performed, only the occupied cell value at the tip end of the beam Bi is updated (+1), the occupied cell C1 in which the object is present remains in the temporary map, and the free cells C2 through which the beam B passed are not reflected on the temporary map. The above-described steps ST11 to ST17 form a first processing step of the present invention. Note that if ray casting is performed at this stage without determination on the validity and even the free cells C2 are accumulated as in the typical technique, the occupied grid map M1 as shown in FIG. 9(A) is produced. In the occupied grid map M1, portions determined as erroneously-determined cells C2' due to erroneous determination on passage of the beam Bi due to cell discretization are, as described above, caused at positions where the wall W or the object O is supposed to be present because of a great incident angle θ of the beam Bi.

Next, the map construction section 5 sets, for all pieces of the detection information stored in the storage 55, multiple determination points Pj on the beam Bi, and resets the indices of the determination points Pj to zero (j=0) (the step ST18). Next, the map construction section 5 acquires the direction vector V2 of the normal line to each determination point Pj by the normal line acquirer 53 (a normal line acquisition step: a step ST19). The map construction section 5 determines whether or not normal line acquisition ended for all determination points Pj (a step ST20). If normal line acquisition ended (YES at the step ST20), the process proceeds to a next step ST22. If normal line acquisition does not end yet (NO at the step ST20), the normal line acquisition step (the step ST19) is, at a step ST21, executed for a next determination point Pj (j=j+1).

When normal line acquisition ended for all determination points Pj by the above-described processing (YES at the step ST20), the map construction section 5 resets the indices of all pieces of the detection information i stored in the storage 55 to zero (i=0) (the step ST22). Next, the map construction section 5 calculates, by the validity determinator 54, the inner product of the unit direction vector V1 of the beam Bi and the unit direction vector V2 of the normal line to each determination point Pj, and based on such calculation, determines the validity of the detection information on such a determination point Pj (a validity determination step: a step ST23). At the validity determination step (the step ST23), the validity of the detection information on the determination point Pj is determined by any of the above-described first to third determination methods.

Subsequently, the map construction section 5 updates (−1), by ray casting, the cell values of the free cells C2 on the beam Bi without updating the cell value of the occupied cell C1 at the tip end of the beam Bi, and evaluates the cell value of each cell C (a ray casting step: a step ST24). At the ray casting step (the step ST24), the cell value is updated based on the detection information on which the validity is reflected for each determination point Pj, i.e., the detection information (in the case of the first or second determination method) from which the cell values determined as invalid at the validity determination step (the step ST23) are excluded, or the detection information (in the case of the third determination method) that the cell value is multiplied by the weight at the validity determination step (the step ST23).

The map construction section 5 determines whether or not validity determination and ray casting ended for all pieces of the detection information i (a step ST25). If validity determination and ray casting ended (YES at the step ST25), the process proceeds to a next step ST27. If validity determination and ray casting do not end yet (NO at the step ST25), the validity determination step (the step ST23) and the ray casting step (the step ST24) are executed for a next piece of the detection information i (i=i+1) at a step ST26. When validity determination and ray casting ended for all pieces of the detection information i (YES at the step ST25), the map producer 52 produces the occupied map M2 based on the result of ray casting, and stores the produced occupied map M2 in the storage 55 (an occupied map production step: the step ST27). Thereafter, the control section 3 stops operation of each section. The occupied map M2 constructed as described above is, as shown in FIG. 9(B), constructed as a map accurately reproducing the positions and shapes of the wall W and the object O in the space S with no erroneously-determined cell C2' or little erroneously-determined cells C2'. The above-described steps ST18 to ST27 form a second processing step of the present invention.

According to the present embodiment as described above, the following features/advantageous effects can be provided.

(1) The information processing device 2 of the mobile robot 1 acquires the direction vector V2 of the normal line to each determination point Pj on the beam Bi by the normal line acquirer 53, determines the validity of the cell value for each determination point Pj based on the absolute value of the inner product ($\cos \theta$) of the unit direction vector V1 of the beam Bi and the unit direction vector V2 of the normal line by the validity determinator 54, and constructs the occupied map M2 by means of the cell value on which the validity of each determination point Pj is reflected by the map producer 52. Thus, the cell value of the erroneously-determined cell C2' caused by erroneous determination as the absent of the object due to emission of the beam Bi to the object surface with a shallow angle can be eliminated. The occupied map M2 is constructed based on the highly-valid cell values obtained by accurate sensing of the object, and therefore, a map accuracy can be improved.

(2) The map construction section 5 of the information processing device 2 causes the map producer 52 to produce the temporal map based on the detection information obtained at all time points during traveling at the first processing step (the steps ST11 to ST14). Thereafter, at the second processing step (the steps ST15 to ST23), the map construction section 5 causes the normal line acquirer 53 to acquire the normal line to each determination point Pj by means of the presence or absence of the object at the periphery of such a determination point Pj on the temporal map, causes the validity determinator 54 to determine the validity of the cell value for each determination point Pj, and causes the map producer 52 to produce the occupied map M2 by means of the cell values on which the validity of the determination points Pj is reflected. Thus, the map accuracy can be further improved. That is, the normal line acquirer 53 acquires the normal line to each determination point Pj by means of the temporal map based on the detection information obtained at all time points, and therefore, the normal line to each determination point Pj can be obtained in more accurate mannter according to the data accumulated at all time points.

(3) Further, at the second processing step, the normal line acquirer 53 can acquire, even for the determination point Pj for which the normal line cannot be obtained according to the detection information obtained in real time, the normal line by means of the detection information obtained at all time points, and the validity determinator 54 can determine the validity by means of the obtained normal line. Further, it may only be required that the validity determinator 54 processes only the determination points Pj identified as the normal lines being present based on the detection information obtained at all time points, and therefore, the map producer 52 can construct the occupied map M2 in an efficient manner at a lower calculation cost.

(4) By the first determination method, the validity determinator 54 invalidates the cell values of the cells C with the invalid determination points Pj such that such cell values are not added to the logarithmic odds, and therefore, the map producer 52 can exclude the influence of the cell values with the determination points Pj determined as invalid due to emission of the beams B with shallow angles and the map producer 52 can construct the occupied map M2 in an efficient manner at a lower calculation cost.

(5) By the second determination method, the validity determinator 54 does not use the cell values of the cells C with all determination points Pj on the far side with respect to the invalid determination point Pj on the beam Bi, and for map production, uses the cell values of the cells C with the determination points Pj on the close side with respect to the invalid determination point Pj. Thus, the map producer 52 does not use the cell values for all determination points Pj on the far side with respect to the invalid determination point Pj so that the amount of data to be used can be reduced and the occupied map M2 can be constructed with a higher efficiency.

(6) By the third determination method, the validity determinator 54 uses, as the weight, the absolute value of the inner product calculated for each determination point Pj on the beam Bi, and multiplies the cell value of the cell C with each determination point Pj by the weight. Thus, the validity of the cell value with the determination point Pj can be evaluated in a stepwise manner. The map producer 52 constructs the occupied map M2 by means of the detection information on which the weight on each determination point Pj is reflected, and therefore, the map accuracy can be improved while erroneous object determination is reduced.

Variations of Embodiment

Note that the present invention is not limited to the above-described embodiment, and variations, modifications, etc. within such a range that the object of the present invention can be achieved are included in the present invention.

For example, in the above-described embodiment, no specific example of the mobile robot 1 has been described. Examples of the mobile robot 1 include a service robot and a home robot. More specifically, the examples include a cleaning robot, a security robot, a conveyance robot, and a guide robot. Further, the information processing device 2 of the present invention is not limited to one utilized for the mobile robot 1, and can be utilized for a mobile body such as a self-driving car or a service car. In addition, the movement area of the mobile body may be a two-dimensional planar space or a three-dimensional space. In the case of the three-dimensional space, the mobile body may be a flying body such as a drone.

In the above-described embodiment, the mobile robot 1 includes the information processing device 2. The map producer 52 producing the occupied grid map M, the normal line acquirer 53, the validity determinator 54, the storage 55, etc. are not necessarily provided in the mobile robot 1, but may be provided at other types of equipment communicable with the mobile body. It may be configured such that the occupied grid map M is produced by the other types of equipment and the mobile body autonomously travels based on such an occupied grid map M. Moreover, the mobile body does not necessarily include the mobile section 6, and may be configured to detect the periphery thereof while a user is manually moving, e.g., a wagon on which the detection section 4 is placed.

Figure 10:
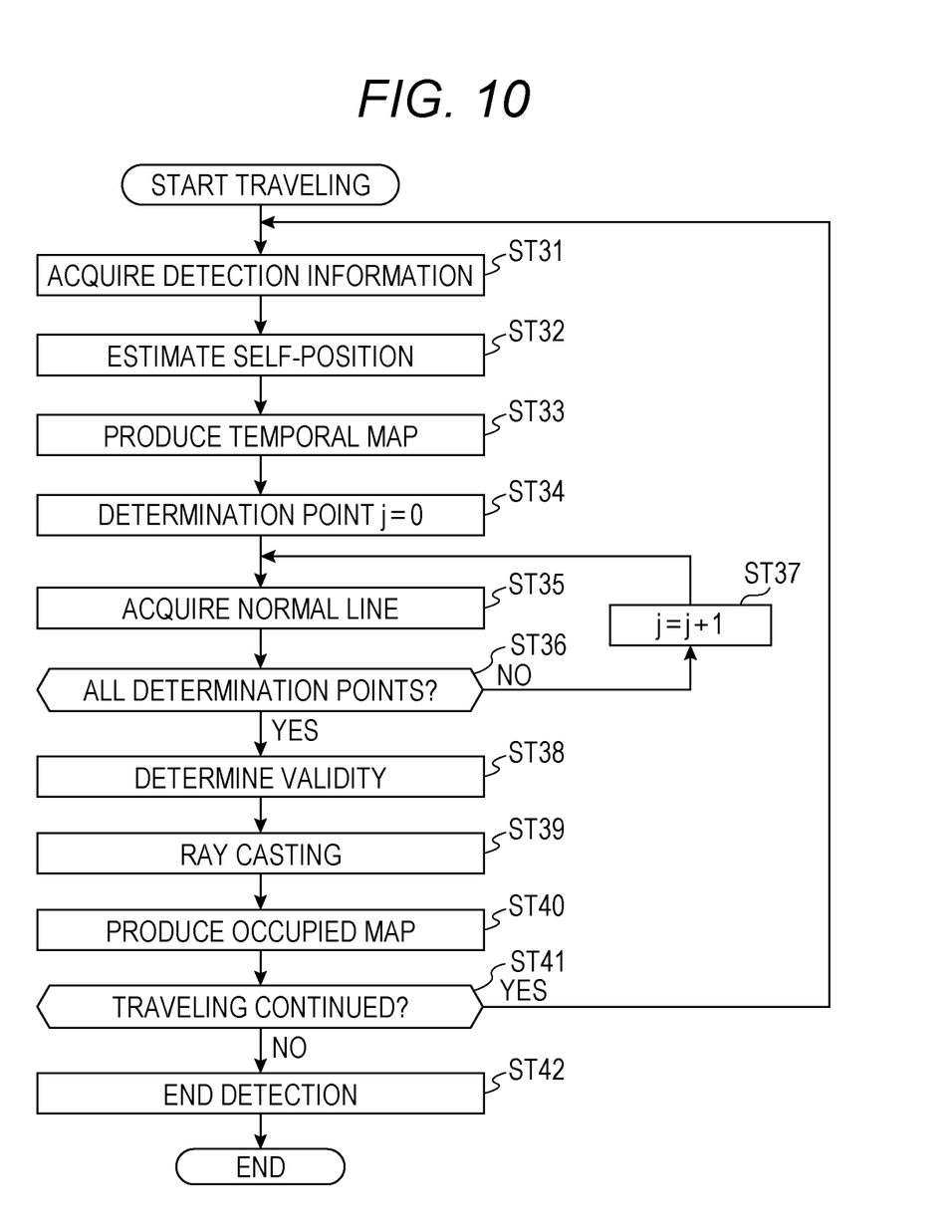
FIG. 10 is a flowchart showing another type of operation of the mobile robot.

In the method for producing the occupied grid map M in the above-described embodiment, after the mobile robot 1 moved in a circle in the space S and returned to the starting point, the temporal map is produced at the temporal map production step (the step ST15) based on the detection information obtained at all time points during traveling (the first processing step). After the normal line acquirer 53 calculated the normal lines to all determination points Pj based on the temporal map and the validity determinator 54 determined the validity of each determination point Pj, the map producer 52 constructs the occupied map M2 (the second processing step). However, the method is not limited to such processing steps. That is, the timing of producing the temporal map is not necessarily the timing after the detection information at all times points for which the mobile robot 1 traveled is acquired, but the temporal map may be produced at such a point that a predetermined number of scans are executed during traveling. At this point, calculation of the normal line to each determination point Pj, determination on the validity of each determination point Pj, and construction of the occupied map M2 may be executed after production of the temporal map. Alternatively, the occupied map M2 may be constructed after the temporal map for the entire traveling path is produced. As shown in FIG. 10, the processing steps of executing the process from detection of the peripheral object to production of the temporal map and construction of the occupied map M2 in real time while the mobile robot 1 is traveling may be employed.

FIG. 10 is a flowchart showing another type of operation of the mobile robot. As shown in the flowchart of FIG. 10, when the mobile robot 1 starts traveling, the laser scanner 41 of the detection section 4 starts detection of the object at the periphery of the mobile robot 1 (a detection information acquisition step: a step ST31), and the detection information acquired by the laser scanner 41 is stored in the storage 55. Moreover, the map construction section 5 causes the self-position estimator 51 to start estimation of the self-position of the mobile robot 1 by the SLAM technique (a self-position estimation step: a step ST32). When the detection information on a single scan is acquired, the map producer 52 produces the temporal map (a temporal map production step: a step ST33). At the temporal map production step (the step ST33), the temporal map is produced based on the detection information on the latest single scan and the previously-acquired detection information.

Next, steps ST34 to ST37 are similar to the steps ST18 to ST21 of the above-described embodiment, and the normal line acquirer 53 acquires the direction vector V2 of the normal line to each determination point Pj (a normal line acquisition step: the step ST35).

Subsequently, the validity determinator 54 calculates the inner product of the unit direction vector V1 of the beam Bi and the unit direction vector V2 of the normal line to each determination point Pj, and based on such calculation, determines the validity of the detection information on each determination point Pj (a validity determination step: a step ST38).

Subsequently, by ray casting, the map construction section 5 does not update the cell value of the occupied cell C1 at the tip end of the beam Bi, updates (−1) the cell values of the free cells C2 on the beam Bi, and evaluates the cell value of each cell C (a ray casting step: a step ST39). At the ray casting step (the step ST39), ray casting is, as in the above-described ray casting step (the step ST24), executed based on the detection information on which the validity is reflected for each determination point Pj, but is different from the above-described ray casting step (the step ST24) in that a target thereof is the detection information scanned until this point. Next, the map producer 52 produces the occupied map M2 based on the result of ray casting (an occupied map production step: a step ST40).

Thereafter, the control section 3 determines whether or not the mobile robot 1 is caused to continuously travel (a step ST41). If traveling is continued (YES at the step ST41), the process returns to the detection information acquisition step (the step ST31) to repeat the above-described steps. If traveling is not continued (NO at the step ST41), the control section 3 ends detection by the laser scanner 41 (a step ST42), and stops operation of each section after the occupied map M2 sequentially produced at the occupied map production step (the step ST40) is stored in the storage 55. According to the steps of constructing the occupied map M2 in real time as described above, the occupied map M2 can be updated as needed as compared to the case of executing the first processing step and the second processing step as in the above-described embodiment.

In the above-described embodiment, the occupied grid map is used as the occupied map M2 as the map indicating the occupation probability at the periphery of the movement path of the mobile body, but the present invention is not limited to such a map. That is, the cell of the occupied map is not necessarily a square or a cube, and the cells are not necessarily aligned in a grid pattern. For example, spherical cells may be set only at the periphery of each point on the point cloud map. In this case, no occupation probability is calculated for a region where no measurement point is present. Moreover, in the above-described embodiment, after the temporal map is produced, the determination points are set on such a temporal map. However, the present invention is not limited to such a configuration. Instead of the temporal map, the determination points may be, based on an occupied map produced at the last time point, set on such an occupied map to calculate the normal lines. In this case, the occupied map produced until the last time point is equivalent to the temporal map of the present invention.

INDUSTRIAL APPLICABILITY

As described above, the present invention can be suitably utilized for an information processing device and a mobile robot capable of reducing erroneous object determination and improving a map accuracy in various mobile bodies moving while producing a map based on detection information on a peripheral object, such as a robot.

LIST OF THE REFERENCE NUMERALS

1 Mobile Robot (Mobile Body)
2 Information Processing Device
3 Control Section
4 Detection Section
5 Map Construction Section
6 Mobile Section
51 Self-Position Estimator
52 Map Producer
53 Normal Line Acquirer
54 Validity Determinator
55 Storage
B Beam
M2 Occupied Map
Pj Determination Point

What is claimed is:
1. An information processing device for processing detection information obtained by detection of an object at a periphery of a mobile body to construct an occupied map as a map indicating an occupation probability at a periphery of a movement path of the mobile body, comprising:

a detector configured to acquire, by emitting beams to the periphery of the mobile body, a presence or absence of the object as the detection information on each beam;

a controller configured to control the detector; and a constructor configured to construct the occupied map, wherein the constructor includes a storage configured to store, in chronological order, the detection information acquired by the detector, a producer configured to produce a temporal map of the periphery of the mobile body based on the detection information stored in the storage, an acquirer configured to acquire, by setting, in the temporal map produced by the producer, each determination point in each cell through which the beam in the detection information passes, a normal line to each determination point based on the presence or absence of the object in a plurality of the cells at a periphery of the cell to which each determination point on the temporal map belongs, and a determinator configured to determine a validity of the detection information on each determination point based on a size of an incident angle as an angle between each beam and the normal line at each determination point, and the producer constructs the occupied map by means of the detection information on which the validity of each determination point is reflected.

2. The information processing device according to claim 1, wherein the constructor executes a first processing step of causing, after movement of the mobile body for a predetermined time and acquisition of the detection information by the detector, the producer to produce the temporal map based on the detection information at all time points stored in the storage, and a second processing step of causing the acquirer to acquire the normal line to each determination point by means of the presence or absence of the object at the periphery of each determination point on the temporal map, causing the determinator to determine the validity of the detection information on each determination point based on the incident angle at each determination point, and causing the producer to construct the occupied map by means of the detection information on which the validity of each determination point is reflected.

3. The information processing device according to claim 1, wherein the determinator sets, as a weight indicating the validity of the detection information on each determination point, a smaller weight for a greater incident angle and a greater weight for a smaller incident angle based on the incident angle at each determination point, and the producer constructs the occupied map by means of the detection information on which the weight set for each determination point by the determinator is reflected.

4. The information processing device according to claim 1, wherein the producer constructs the occupied map without using the detection information on a determination point determined as invalid by the determinator.

5. The information processing device according to claim 1, wherein the producer constructs the occupied map by means of the detection information on each determination point with respect to an invalid determination point determined as invalid by the determinator, the producer not using the detection information on all determination points located beyond the invalid determination point among determination points set on each beam to which the invalid determination point belongs relative to a position of the mobile body.

6. A mobile robot comprising:

the information processing device according to claim 1; and a mobile section configured to move the mobile body.

* * * * *